(12) United States Patent
Magnetto

(10) Patent No.: US 7,805,960 B2
(45) Date of Patent: Oct. 5, 2010

(54) SYSTEM FOR AIR-CONDITIONING AN ENVIRONMENT, IN PARTICULAR THE PASSENGER COMPARTMENT OF A MOTOR VEHICLE

(75) Inventor: Daniela Magnetto, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 450 days.

(21) Appl. No.: 11/551,146

(22) Filed: Oct. 19, 2006

(65) Prior Publication Data
US 2007/0102145 A1    May 10, 2007

(30) Foreign Application Priority Data
Oct. 21, 2005   (EP) .................................. 05425742

(51) Int. Cl.
*F25B 17/08* (2006.01)
(52) U.S. Cl. ..................... 62/480; 62/324.1; 62/239; 62/478; 62/244
(58) Field of Classification Search ........... 62/239, 62/480, 324.1, 478, 244
See application file for complete search history.

(56) References Cited

U.S. PATENT DOCUMENTS

| | | | |
|---|---|---|---|
| 4,843,826 A * | 7/1989 | Malaker | 62/6 |
| 5,438,842 A * | 8/1995 | Watkins et al. | 62/89 |
| 5,901,780 A | 5/1999 | Zeigler et al. | 165/42 |
| 6,415,625 B1 * | 7/2002 | Rockenfeller et al. | 62/476 |
| 2005/0274138 A1 * | 12/2005 | Golben | 62/480 |
| 2006/0075766 A1 * | 4/2006 | Ziehr et al. | 62/186 |

FOREIGN PATENT DOCUMENTS

| | | |
|---|---|---|
| DE | 44 13 032 | 4/1995 |
| JP | 61-113513 | 5/1986 |
| WO | WO 93/02328 | 2/1993 |

* cited by examiner

*Primary Examiner*—Cheryl J Tyler
*Assistant Examiner*—Jonathan Koagel
(74) *Attorney, Agent, or Firm*—Seed Intellectual Property Law Group PLLC

(57) ABSTRACT

The air conditioning system including at least one sensor of the thermal comfort of the passenger compartment of a motor vehicle, and an apparatus having at least one pair of heat-exchanger units, each designed to increase and reduce said temperature at alternating intervals under the control of the sensor. Each heat-exchanger unit comprises a substrate having the property of absorbing and releasing heat according to the absorption of a gas. The two substrates are set in two hermetic casings in communication with one another through a compressor and a series of valves, which can be actuated so as to transfer the gas alternately from one to another of the two substrates. Each heat exchanger unit also includes an outlet conveyor with an outlet opening to the passenger compartment and another outlet opening towards the outside. The two outlets are controlled by hatches that can be actuated intermittently so as to send hot air or cold air continuously into the passenger compartment.

19 Claims, 4 Drawing Sheets

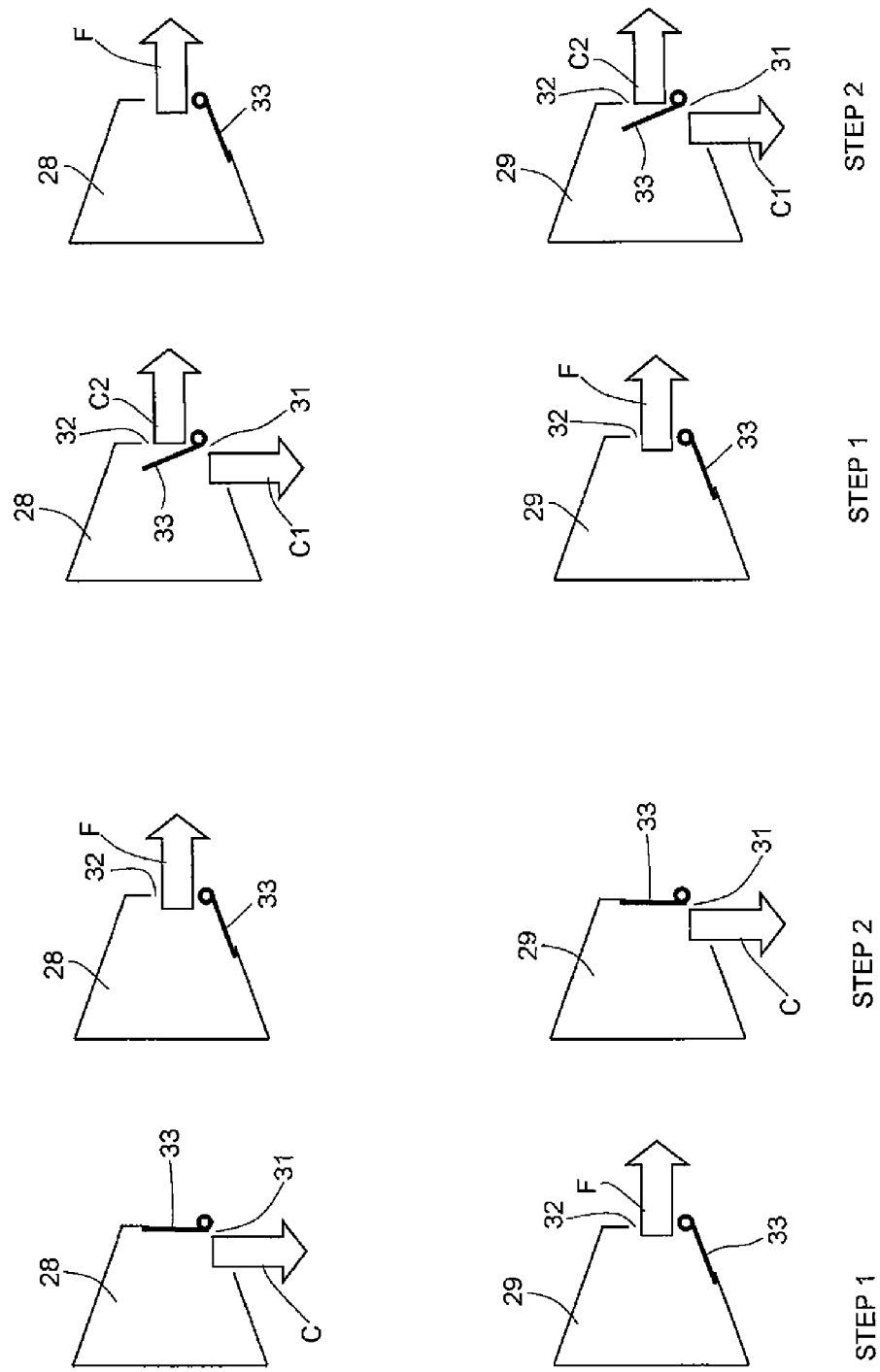

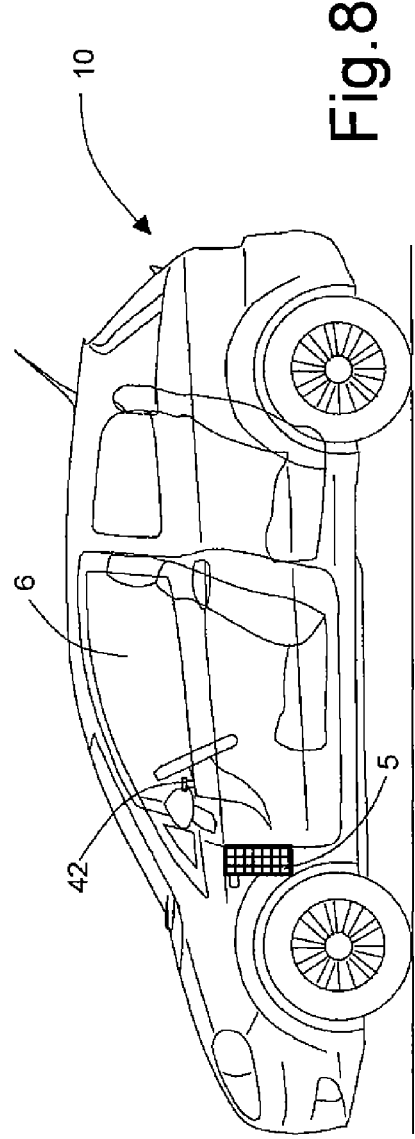
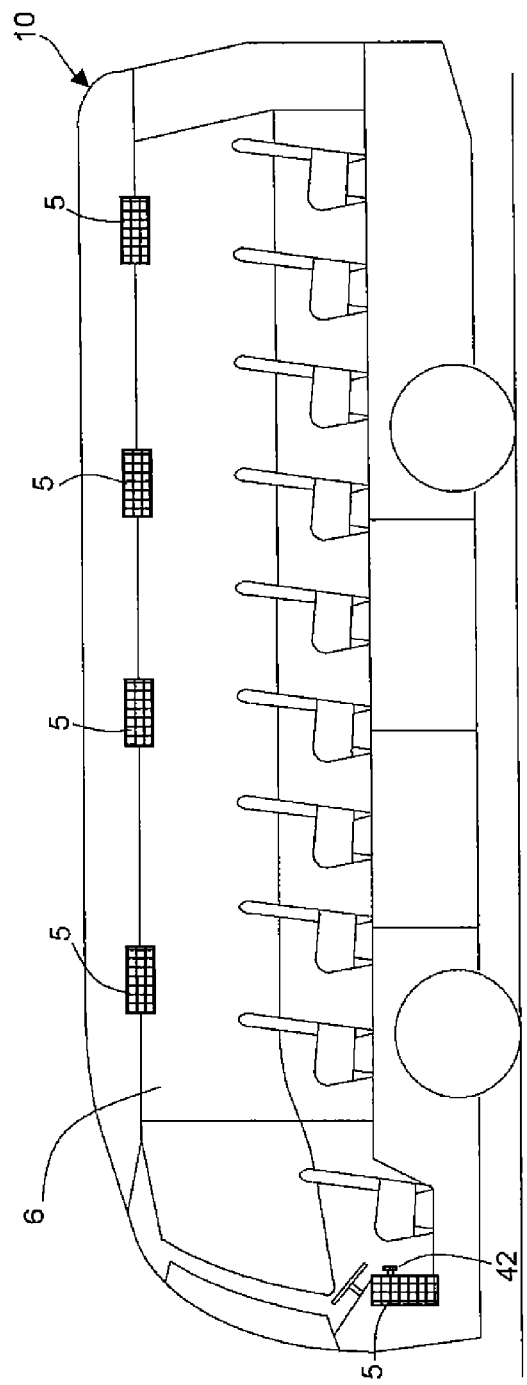

SYSTEM FOR AIR-CONDITIONING AN ENVIRONMENT, IN PARTICULAR THE PASSENGER COMPARTMENT OF A MOTOR VEHICLE

BACKGROUND OF THE INVENTION

1. Field of the Invention

The present invention relates to a system for air-conditioning an environment, in particular the passenger compartment of a motor vehicle.

2. Description of the Related Art

As is known, a system for air-conditioning an environment must enable change of the air thereof, as well as heating, in the case of low external temperatures, and conditioning, including refrigeration and dehumidification of the air, in the case of high external temperatures.

Normally, air-conditioning involves a high consumption of energy, so that it generally entails a high running cost. In any case, said energy is almost always generated by burning a fuel, so that in practice air-conditioning also generates an increase in atmospheric pollution. In turn, the cooling circuit involves the use of gases that are harmful for the ozone layer in the atmosphere.

BRIEF SUMMARY OF THE INVENTION

One aim of the invention is to provide an air-conditioning system for conditioning an environmentone of the uses is in passenger compartment of a motor vehicle, to provide high energy efficiency, low environmental impact and low cost, while at the same time being capable of performing the same functions as those of a traditional system. The present invention also reduces some of the drawbacks of the air-conditioning systems of the known art.

According to the invention, an air-conditioning system for conditioning an environment, is set forth in the claims appended hereto.

BRIEF DESCRIPTION OF THE SEVERAL VIEWS OF THE DRAWINGS

For a better understanding of the invention, described herein is a preferred embodiment, provided by way of example with the aid of the annexed drawings, wherein:

FIG. 6 is a diagram of the operation of the variant of FIG. 2 of the apparatus, for cooling the environment;

FIG. 7 is a diagram of the operation of the variant of FIG. 3 of the apparatus, also for cooling the environment;

FIG. 8 is a diagram of the air-conditioning system applied in an automobile; and FIG. 9 is a diagram of the air-conditioning system applied in a bus.

DETAILED DESCRIPTION OF THE INVENTION

Figure 1:
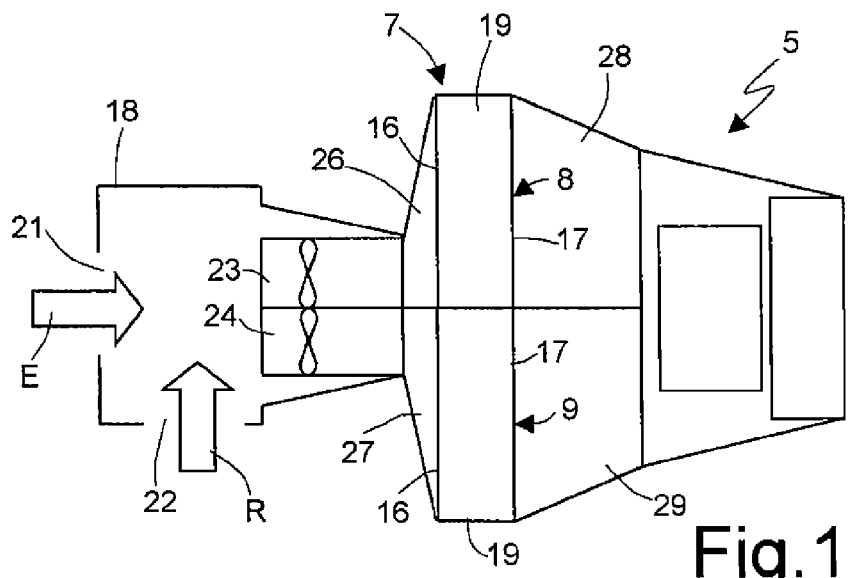
FIG. 1 is a block diagram of an apparatus for an air-conditioning system according to the invention.

With reference to FIG. 1, the number 5 designates as a whole an apparatus for an air-conditioning system for conditioning an environment, for example the passenger compartment 6 of a motor vehicle 10 (see also FIG. 8). The apparatus 5 comprises a heat-exchanger 7, designed to be actuated intermittently for varying the temperature of the air in the passenger compartment 6.

Figure 4:
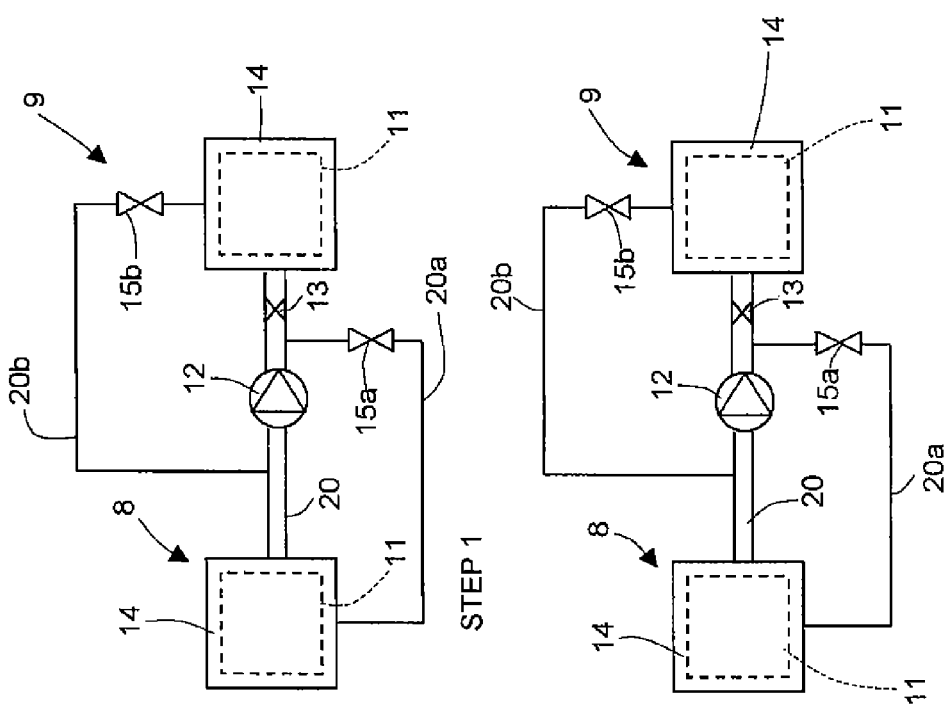
FIG. 4 is a diagram of the operation of a pair of heat-exchanger units for the apparatus of FIG. 1.

According to the invention, the heat-exchanger 7 is designed to provide thermodynamic cycles based upon processes of absorption and release of thermal energy. In particular, the heat-exchanger sometimes referred to herein as a heat-exchanger means 7 comprise a pair of heat-exchanger units 8 and 9, which enable the transfer of thermal energy between characteristic levels of the thermodynamic cycles, in which each heat-exchanger unit 8, 9 is designed to increase and reduce the temperature of the air at alternating intervals. Each heat-exchanger unit 8, 9 thus has the property of absorbing and releasing heat as a function of the absorption of an aeriform on a corresponding solid matrix 11 (FIG. 4), in a known way.

In particular, as aeriform hydrogen can be used, which may be absorbed by the matrix 11 to form metallic hydrides or may be released by the matrix 11 as a function of the pressure (or temperature) of the hydrogen. The matrix 11 can be formed by a substrate made of metal alloy. Above a pressure of equilibrium, which is characteristic of the alloy, there is an absorption of hydrogen in an exothermic process, so that the unit 8, 9 yields heat to the passenger compartment 6, while below said pressure of equilibrium there is a release of hydrogen in an endothermic process, so that the unit 8, 9 absorbs heat from the passenger compartment 6, so cooling it.

For this purpose, the substrate 11 of each of the two heat-exchanger units 8 and 9 is set in a corresponding hermetic casing 14. The two casings 14 are connected by means of a main duct 20, in which a compressor 12 and a shutoff valve 13 are set. The duct 20 is moreover connected to the two casings 14 by means of two corresponding secondary ducts 20a and 20b, in which two corresponding shutoff valves 15a and 15b are set. The valves 13, 15a and 15b are designed to be actuated intermittently so as to compress the hydrogen alternately on the two casings 14 of the matrices 11.

In particular, in a step 1 the valve 13 is open and the two valves 15a and 15b are closed, so that the compressor 12 takes in hydrogen from the casing 14 of the heat-exchanger unit 8, where it generates cold, and compresses it in the casing 14 of the heat-exchanger unit 9, where it generates heat. In a step 2 the valve 13 is closed and the valves 15a and 15b are opened so that the compressor 12 takes in hydrogen from the heat-exchanger unit 9, which now generates cold and compresses the hydrogen in the heat-exchanger unit 8, which now generates heat.

Each heat-exchanger unit 8, 9 is enclosed in a corresponding casing 19 (FIG. 1) having an inlet 16 and an outlet 17. By passing the air through the casing 19 of the two units 8 and 9, and repeating the alternation of the two steps described above, two intermittent flows of hot and cold air are generated in the outlets 17, i.e., each unit 8, 9 generates cyclically and alternately said hot and cold air. There is thus provided a heat pump capable of transferring the heat between the external environment and the passenger compartment 6 (see also FIG. 8). To ensure air-conditioning of the passenger compartment 6 of a motor vehicle 10, it is sufficient to manage appropriately the two flows of hot and cold air thus generated.

For this purpose, the air-conditioning apparatus 5 (FIG. 1) comprises an inlet conveyor 18, which, through an opening 21, enables a flow E of the air from the external environment to be taken in, and through a second opening 22 enables a flow R of air from the passenger compartment 6 to be drawn off. The two openings 21 and 22 are controlled by corresponding hatches, not indicated in FIG. 1, which are openable selectively by hand, by means of the usual controls set on the dashboard of the motor vehicle 10, or else managed by an automatic control.

Figure 2:
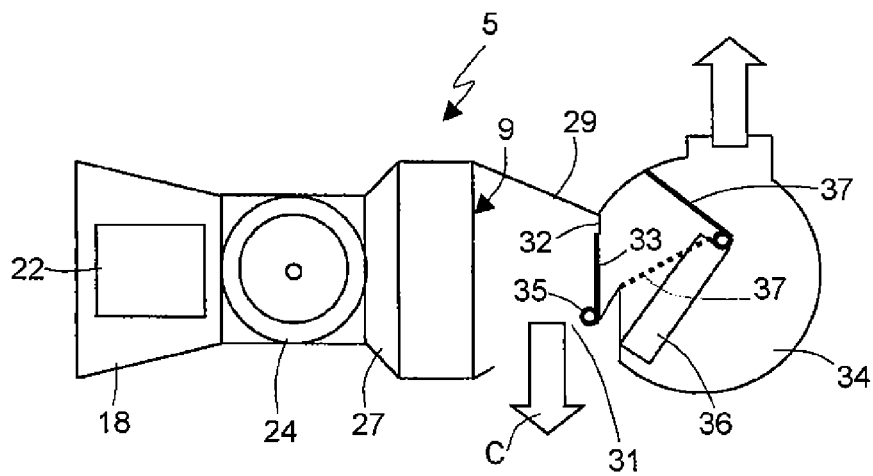
FIG. 2 is a bottom view of the block diagram of FIG. 1, according to a first variant of the invention.

From the inlet conveyor 18, the air is drawn in by means of a pair of electric fans 23 and 24 associated to the heat-exchanger units 8 and 9, and through two corresponding intake conveyors 26 and 27 is sent to the inlets 16 of the casings 19 of the two heat-exchanger units 8 and 9. The outlet 17 of each heat-exchanger unit 8, 9 is connected to a corresponding outlet conveyor 28, 29, each equipped with a pair of openings 31 and 32 (FIGS. 2 and 3) controlled by corresponding hatches. Advantageously, the two openings 31 and 32 of each conveyor 28, 29 can be set in such a way as to be controlled by one and the same hatch 33 that can rotate on an edge 35 thereof.

In each heat-exchanger unit 8 and 9, the opening 31 is in communication with the external environment, while the opening 32 is in communication with the passenger compartment 6 through a mixing chamber 34. According to the variant of FIG. 2, set in the chamber 34 is a radiator 36, i.e., a heat exchanger for exchanging heat between the water of the engine and the air so that the radiator 36 functions only with the engine turned on. The radiator 36 can be inserted or excluded by means of a hatch 37.

Figure 5:
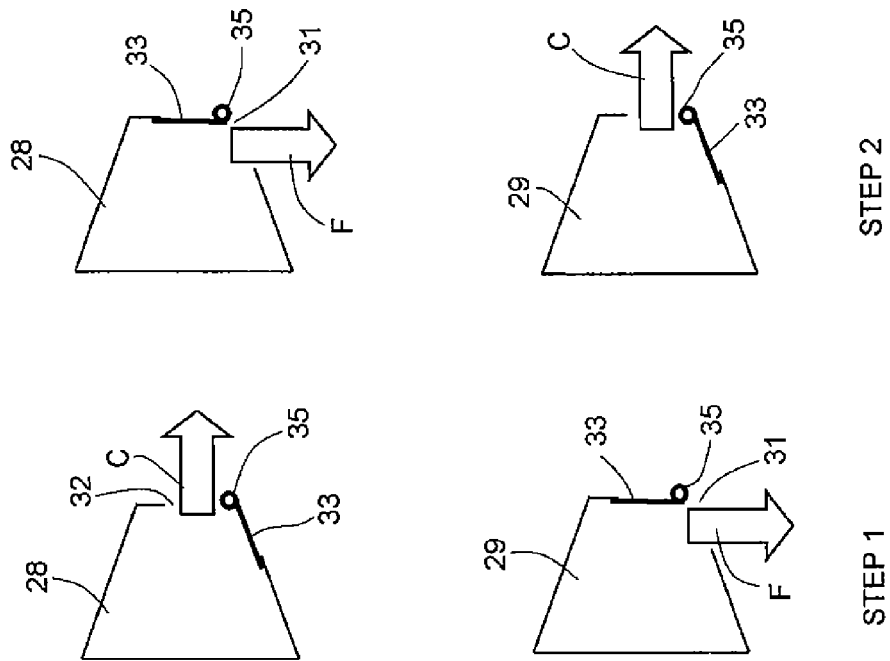
FIG. 5 is a diagram of the operation of the apparatus of FIG. 1 for heating the environment.

FIG. 5 illustrates the positions of the hatches 33 of the two outlet conveyors 28 and 29 in the two steps of operation of the units 8 and 9 to obtain heating of the air sent to the passenger compartment 6. In particular, to obtain heating, in step 1 the conveyor 28 discharges a flow of heated air C, through the opening 32, into the chamber 34 (see also FIG. 2), while the conveyor 29 discharges a flow of cooled air F, through the opening 31, towards the outside. Instead, in step 2 the conveyor 28 discharges a flow of cooled air F towards the outside, while the conveyor 29 discharges a flow of heated air C, through its opening 32, into the chamber 34. From the chamber 34, each flow of heated air C passes into the passenger compartment 6, which is thus heated continuously.

Illustrated, instead, in FIG. 6 are the positions of the hatches 33 of the two outlet conveyors 28 and 29 in the two steps of operation of the units 8 and 9 to obtain conditioning of the air. In step 1, the conveyor 28 discharges a flow of heated air C, through the opening 31, into the external environment, while the conveyor 29 discharges a flow of cooled air F, through the opening 32, into the chamber 34. Instead, in step 2 the conveyor 28 discharges a flow of cooled air F into the chamber 34, while the conveyor 29 discharges a flow of heated air C into the external environment.

In the case where the air to be introduced into the passenger compartment 6 is excessively cold, with the engine turned on it can be post-heated in the chamber 34 by causing it to pass through the radiator 36. In this way, with the engine turned on or just started, a rapid cooling of the passenger compartment 6 is obtained. Subsequently, with the engine hot, it is possible to reduce cooling of the flow F towards the passenger compartment 6, and in any case cooling of the water of the engine is facilitated. Obviously, by turning the hatch 37 in a counterclockwise direction, as viewed in FIG. 2, it moves into the position designated by dashed lines, bypassing the radiator 36. The radiator 36 can also be used for accelerating heating as illustrated in FIG. 5, or else can serve to obtain heating without actuating the compressor 12, FIG. 4 of hydrogen between the two units 8 and 9.

Figure 3:
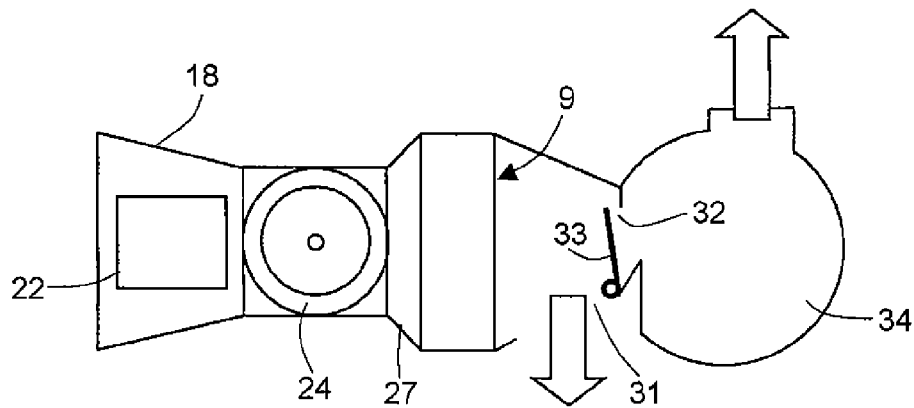
FIG. 3 is a bottom view of the block diagram of FIG. 1, according to another variant of the invention.

According to the variant of the apparatus 5 illustrated in FIG. 3, positioning of the two hatches 33 can be modulated at each cycle so as to set each hatch 33 in a position intermediate between the two openings 31 and 32. In this case, heating can be carried out as indicated in FIG. 5, while conditioning is carried out as indicated in FIG. 7. In particular, for conditioning, in step 1 the conveyor 28 discharges a part C1 of the flow of heated air through the opening 31 into the external environment, and a part C2 of the flow of heated air, through the opening 32, into the chamber 34. In turn, the conveyor 29 discharges the flow of cooled air F through the opening 32 into the chamber 34. Instead, in step 2 the conveyor 28 discharges the flow of cooled air F into the chamber 34, while the conveyor 29 discharges a part C1 of the flow of heated air into the external environment and a part C2 of the flow of heated air into the chamber 34.

The air-conditioning system, which is set within the motor vehicle 10, such as shown FIGS. 8 and 9, is designed to control the compressor 12 of hydrogen, the valves 13, 15a and 15b, and the hatches 33 and 37. In particular, the system comprises an electronic control unit designed to receive signals on the values of parameters of comfort, such as temperature and humidity, detected by pairs of sensors appropriately set in the passenger compartment 6. In the case of an automobile, see FIG. 8, it is possible to set just one apparatus 5 in the area of the front seats. Furthermore, it is possible to set one pair of sensors in a position corresponding to the front seats, and another pair of sensors in a position corresponding to the rear seats.

In the case of a bus, see FIG. 9, various air-conditioning apparatuses 5 can be provided, one of which can be set in a position corresponding to the driver's seat. In the passenger compartment various other apparatuses 5 can be set, in one or two rows. The pairs of sensors can be set one in a position corresponding to the driver's seat and at least one in the passenger compartment, in particular towards the rear end of said compartment.

The vehicle can be constituted by a vehicle for transportation of goods, which is equipped with an apparatus for conditioning of the cab, and one or more conditioning apparatuses set in the usual compartment provided for the transportation of goods so as to be used for the conditioning or refrigeration of said goods.

In all of the cases described above, provided in the passenger compartment 6, preferably on the dashboard of the motor vehicle 10, is at least one member for setting the temperature perceived that it is desired to obtain, for example a slider 42 that can be actuated by hand. The air treated by the conditioning apparatus can be distributed in the passenger compartment by means of the traditional system of distribution ducts, ensuring the maintenance of the standard functions of the entire air-conditioning assembly, including the heating, ventilation, cooling, conditioning, demisting, defrosting.

From what has been seen above, the advantages of the air-conditioning system according to the invention as compared to the known art emerge clearly evident. In particular, atmospheric pollution is reduced, and the risk of damaging the ozone layer of the atmosphere, caused by the fluid of common refrigerators, is eliminated.

It is understood that various modifications and improvements can be made to the air-conditioning system described herein, without departing from the scope of the claims. For example, the heat exchangers can be different from the metallic-hydride one and the coolant fluid can be different from hydrogen. Furthermore, the apparatus 5 can be equipped with just one heat exchanger, in which case an intermittent air flow is sent to the passenger compartment 6.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A system for conditioning the air in an environment, comprising:
   an air inlet conveyor comprising
      an outside environment air inlet in fluid communication with an outside environment,
      a recirculated air inlet in fluid communication with a vehicle compartment,
      a mixing chamber in which air from the outside environment air inlet mixes with air from the recirculated air inlet, and
      an inlet hatch device configured to alternatively select air flow from at least one of the outside environment air inlet and the recirculated air inlet for delivery out of the air inlet conveyor, the inlet hatch device positioned at an upstream region of the mixing chamber, a first air flow inlet path and a second air flow inlet path positioned downstream of the mixing chamber and spaced apart from the inlet hatch device, the second air flow inlet path being spaced apart and separate from the first air flow inlet path such that air downstream of the inlet hatch device and in the mixing chamber is divided into a first flow of air that travels along the first air flow inlet path and a second flow of air that travels along the second air flow inlet path; and
   at least one pair of heat-exchanger units in fluid communication with the air inlet conveyor, each of the heat-exchanger units being downstream of the mixing chamber and configured to reduce the temperature of the air selected by the inlet hatch device and delivered out of the air inlet conveyor along respective ones of the first and second air flow inlet paths, each heat-exchanger unit having a cyclic and reciprocal operation with respect to the other heat-exchanger unit, in such a way that in a first half-cycle a first heat-exchanger unit reduces the temperature of the air flowing therethrough, while in a second half-cycle, the first heat-exchanger unit increases the temperature of the air flowing therethrough;
   an outlet conveyor assembly in fluid communication with the at least one pair of heat-exchanger units, the outlet conveyor assembly comprising
      a recirculated air outlet in fluid communication with the vehicle compartment,
      an outside environment outlet in fluid communication with the outside environment, and
      a outlet hatch device configured to alternatively deliver air from the pair of heat-exchanger units to the outside environment.

2. The air-conditioning system according to claim 1, wherein each of said heat-exchanger units comprises a corresponding substrate having the property of absorbing and releasing heat according to the absorption of a gas.

3. The air-conditioning system according to claim 2, wherein said gas is hydrogen, and that said substrate is a metal alloy, said absorption taking place according to the pressure or temperature of the hydrogen.

4. A vehicle comprising the air-conditioning system of claim 1.

5. The vehicle according to claim 4, wherein said vehicle is a bus having a seat for a driver and a passenger compartment, wherein the bus comprises at least one conditioning apparatus set in a position corresponding to the driver's seat and one or more conditioning apparatuses set in positions corresponding to the passenger compartment.

6. The vehicle according to claim 4, wherein said vehicle is a vehicle for the transportation of goods, wherein the vehicle comprises an apparatus for conditioning a cab of the vehicle, and one or more conditioning apparatuses set in a compartment provided for the transportation of goods so as to be used for conditioning or refrigeration of said goods.

7. The air-conditioning system according to claim 1, wherein the outlet hatch device rotates from a first position to close the recirculated air outlet and to open the outside environment outlet and a second position to open the recirculated air outlet and to close the outside environment outlet.

8. The air-conditioning system according to claim 1, wherein the air inlet conveyor includes a first intake conveyor defining the first air flow inlet path and a second intake conveyor defining the second air flow inlet path such that the air flow selected by the inlet hatch device is separated into the first flow of air along the first air flow inlet path and the second flow of air along the second air flow inlet path.

9. The air-conditioning system according to claim 1, wherein the outlet hatch device includes a plate rotatable about an axis of rotation, the plate is rotatable about the axis of rotation from a first position to block the recirculated air outlet to a second position to block the outside environment outlet.

10. A system for conditioning air in an environment, comprising:
   an air inlet conveyor comprising
      an outside air inlet,
      a recirculated air inlet, and
      an inlet hatch device configured to alternatively select air flow from at least one of the outside air inlet and the recirculated air inlet for delivery out of the air inlet conveyor;
   at least one pair of heat-exchanger units in fluid communication with the air inlet conveyor such that the inlet hatch device is positioned upstream of a first air flow inlet path to one of the heat-exchanger units and a second air flow inlet path to the other heat-exchanger unit, each of the heat-exchanger units being configured to reduce the temperature of the air selected by the inlet hatch device and delivered out of the air inlet conveyor, each heat-exchanger unit having a cyclic and reciprocal operation with respect to the other heat-exchanger unit, in such a way that in a first half-cycle one of the heat-exchanger units reduces the temperature of the air flowing therethrough, while in a second half-cycle the one of the heat-exchanger units increases the temperature of the air flowing therethrough;
   a switching device for setting the output of said heat-exchanger units alternately in communication with a passenger compartment of a vehicle, wherein each of said heat-exchanger units is associated to an outlet conveyor, each outlet conveyor having a first outlet opening to said passenger compartment and a second outlet opening towards an outside environment, said switching device configured to intermittently set said first outlet opening in communication with the passenger compartment while blocking air flow to the outside environment; and
   a chamber being positioned downstream of each of the first outlet openings of the outlet conveyors to the passenger compartment, wherein in a first state of operation, said chamber guiding air that has passed through one of the first outlet openings of one of the outlet conveyors to the passenger compartment; wherein in a second state of operation, said chamber guiding air that has passed through the other one of the first outlet openings of the other outlet conveyor to the passenger compartment; and wherein in a third state of operation, said chamber mixing the air from the first outlet openings of the outlet conveyors and outputting the mixed air to the passenger compartment.

11. The air-conditioning system according to claim 10, wherein the switching device includes a hatch for the outlet openings of the corresponding heat-exchanger units, said hatch being actuated in concomitance so as to introduce hot air or cold air continuously into said environment.

12. The air-conditioning system according to claim 11, wherein said hatches are controlled by an electronic control unit, which comprises a processing unit so as to introduce into the passenger compartment a continuous flow of cooled or heated air, as requested by the user.

13. The air-conditioning system according to claim 10, further comprising an electronic control unit that is programmed to move the switching device to a first configuration for the first state of operation, a second configuration for the second state of operation, and a third configuration for the third state of operation.

14. A system for conditioning air in a vehicle, the system comprising:
a first heat-exchanger unit configured to change a temperature of air flowing therein;
a second heat-exchanger unit configured to change a temperature of air flowing therein, the second heat-exchanger unit having a reciprocal operation with respect to the first heat-exchanger unit such that one of the first and second heat-exchanger units heats air while the other one of the first and second heat-exchanger units cools air;
an inlet conveyor including
an outside air inlet fluidically coupling an external environment to at least one of the first and second heat-exchanger units,
a recirculated air inlet fluidically coupling a compartment of the vehicle to both the first heat-exchanger unit and the second heat-exchanger unit,
a mixing chamber in which air from the outside air inlet mixes with air from the recirculated air inlet;
a first intake conveyor extending between the mixing chamber of the inlet conveyor and the first heat-exchanger unit to define a first air flow inlet path to the first heat-exchanger unit;
a second intake conveyor extending between the mixing chamber of the inlet conveyor and the second heat-exchanger unit to define a second air flow inlet path to the second heat-exchanger unit, the second air flow inlet path being spaced apart from the first air flow inlet path; and an inlet hatch device configured to alternatively allow air from the external environment to pass through the outside air inlet and allow air in the compartment to pass through the recirculated air inlet to both the first heat-exchanger unit and the second heat-exchanger unit, the inlet hatch device positioned upstream of at least a portion of the mixing chamber of the inlet conveyor such that air downstream of the inlet hatch device and in the mixing chamber is divided into a first flow of air traveling along the first air flow inlet path and a second flow of air traveling along the second air flow inlet path.

15. The system for conditioning of claim 14, further comprising:
a first fan positioned in the first intake conveyor and along the first air flow inlet path; and
a second fan positioned in the second intake conveyor and along the second air flow inlet path.

16. The system for conditioning of claim 14, further comprising:
a first outlet conveyor that receives air from the first heat-exchanger unit, the first outlet conveyor including a first passenger compartment outlet and a first external environment outlet;
a second outlet conveyor that receives air from the second heat-exchanger unit, the second outlet conveyor including a second passenger compartment outlet and a second external environment outlet; and
a deviator configured to selectively open and close each of the first passenger compartment outlet, the first external environment outlet, the second passenger compartment outlet, and the second external environment outlet.

17. The system for conditioning of claim 16, wherein the deviator includes a hatch movable between a first position and a second position, the hatch in the first position directs air from the first heat-exchanger unit through the first passenger compartment outlet and directs air from the second heat-exchanger unit through the second external environment outlet, the hatch in the second position directs air from the first heat-exchanger unit through the first external environment outlet and directs air from the second heat-exchanger unit through the second passenger compartment outlet.

18. The system of claim 14, wherein the outside air inlet is positioned in a front portion of the inlet conveyor, a substantially straight air flow path extends from the outside air inlet to at least one of the first intake conveyor and the second intake conveyor, and the recirculated air inlet is positioned along a side of the inlet conveyor and between the outside air inlet and the at least one of the first intake conveyor and the second intake conveyor, the recirculated air inlet is spaced apart from the substantially straight air flow path.

19. The system of claim 18, wherein the recirculated air inlet is positioned such that air flow through the recirculated air inlet travels substantially perpendicular to and towards the substantially straight air flow path.

* * * * *